US006631450B1

(12) United States Patent
Arimilli et al.

(10) Patent No.: US 6,631,450 B1
(45) Date of Patent: Oct. 7, 2003

(54) SYMMETRIC MULTIPROCESSOR ADDRESS BUS PROTOCOL WITH INTRA-CACHE LINE ACCESS INFORMATION

(75) Inventors: Ravi K. Arimilli, Austin, TX (US); John Steven Dodson, Pflugerville, TX (US); James Stephen Fields, Jr., Austin, TX (US); Guy Lynn Guthrie, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 106 days.

(21) Appl. No.: 09/696,889

(22) Filed: Oct. 26, 2000

(51) Int. Cl.⁷ ............................................... G06F 12/08
(52) U.S. Cl. ...................... 711/146; 711/117; 711/141; 711/154
(58) Field of Search ................................ 711/100, 117, 711/118, 119, 141, 146, 154

(56) References Cited

U.S. PATENT DOCUMENTS

| | | | |
|---|---|---|---|
| 5,335,335 A | * 8/1994 | Jackson et al. | 711/141 |
| 5,355,467 A | * 10/1994 | MacWilliams et al. | 711/141 |
| 5,369,753 A | * 11/1994 | Tipley | 711/118 |
| 5,737,759 A | 4/1998 | Merchant | |
| 5,809,533 A | * 9/1998 | Tran et al. | 711/141 |
| 5,890,200 A | 3/1999 | Merchant | |
| 5,987,571 A | 11/1999 | Shibata et al. | |
| 5,995,967 A | 11/1999 | Iacobovici et al. | |
| 6,052,760 A | 4/2000 | Bauman et al. | |
| 6,138,217 A | * 10/2000 | Hamaguchi | 711/141 |
| 6,230,260 B1 | 5/2001 | Luick | |
| 6,282,615 B1 | * 8/2001 | Arimilli et al. | 711/122 |

OTHER PUBLICATIONS

"Processor Performance Monitoring With A Depiction Of The Efficiency Of The Cache Coherency Protocol Of Superscalar Microprocessor In An Symmetric Multiple Processor Environment"; IBM TDB, vol. 40, No. 1, Jan. 1997, pp. 79–81 XP000686109.

* cited by examiner

Primary Examiner—Tuan V. Thai
(74) Attorney, Agent, or Firm—Casimer K. Salys; Bracewell & Patterson, L.L.P.

(57) ABSTRACT

System bus masters within a multiprocessor system in which dynamic application sequence behavior information is maintained within cache directories append the historical access information for the target cache line to their requests. Snoopers and/or the system controller, which may also maintain dynamic application sequence behavior information in a history directory, employ the appended access information for cache management.

27 Claims, 7 Drawing Sheets

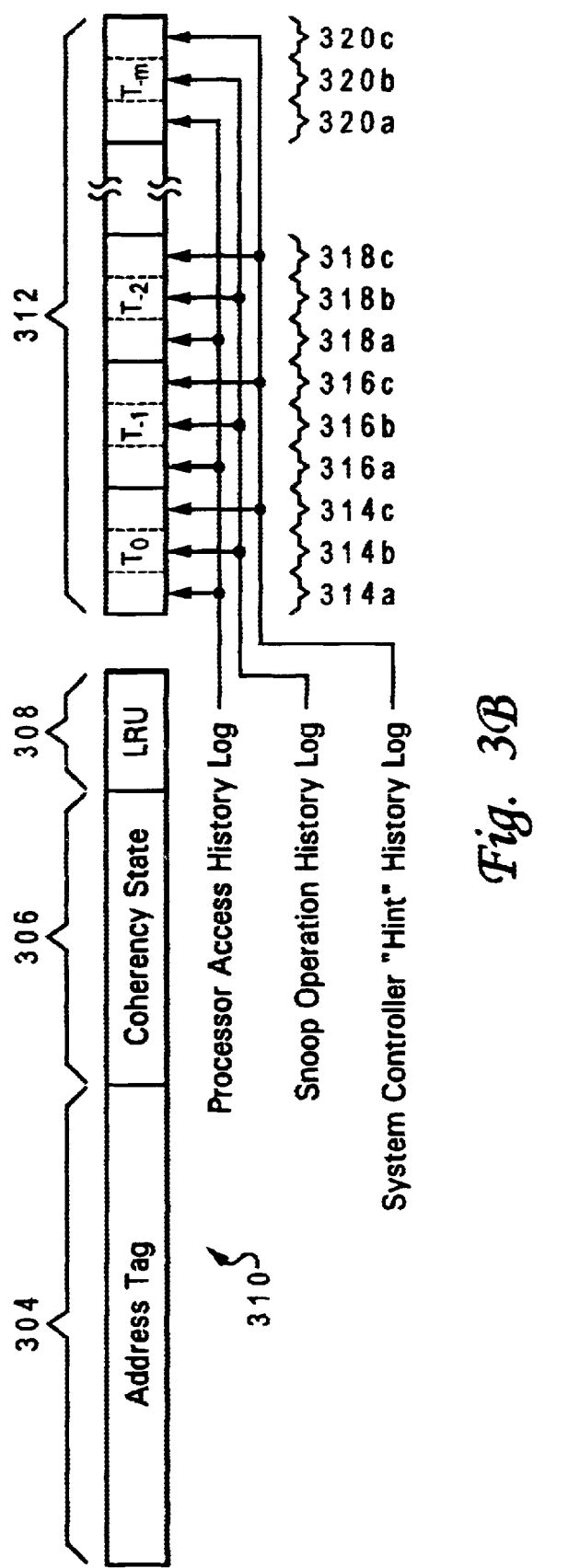
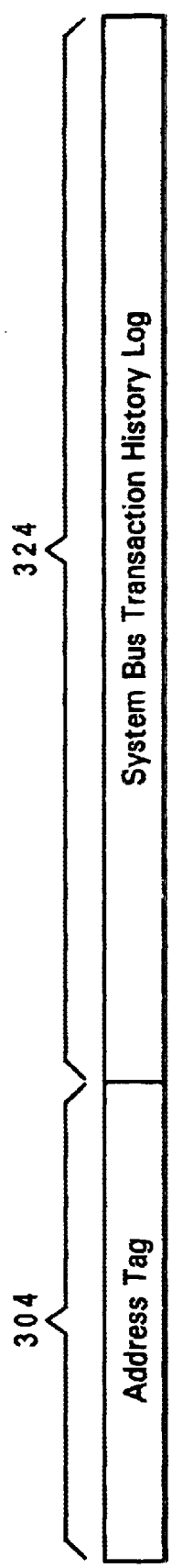
Fig. 3B
Fig. 3C

US 6,631,450 B1

SYMMETRIC MULTIPROCESSOR ADDRESS BUS PROTOCOL WITH INTRA-CACHE LINE ACCESS INFORMATION

RELATED APPLICATIONS

The present invention is related to the subject matter of commonly assigned, copending United States patent applications: Ser. No. 09/696,888; Ser. No. 09/696,912; Ser. No. 09/696,887; Ser. No. 09/696,890; and Ser. No. 09/696,910. The content of the above-identified applications are incorporated herein by reference.

BACKGROUND OF THE INVENTION

1. Technical Field

The present invention generally relates to an improved data processing system and in particular to improved memory management in a data processing system. Still more particularly, the present invention relates to improved cache memory management in a data processing system, which includes an improved address bus protocol.

2. Description of the Related Art

Most data processing systems are controlled by one or more processors and employ various levels of memory. Typically, programs and data are loaded into a data processing system's memory storage areas for execution or reference by the processor, and are stored in different portions of the memory storage depending on the processor's current need for such programs or data. A running program or data referenced by a running program must be within the system's main memory (primary or main storage, which is typically random access memory). Programs or data which are not needed immediately may be kept in secondary memory (secondary storage, such as a tape or disk drive) until needed, and then brought into main storage for execution or reference. Secondary storage media are generally less costly than random access memory components and have much greater capacity, while main memory storage may generally be accessed much faster than secondary memory.

Within the system storage hierarchy, one or more levels of high-speed cache memory may be employed between the processor and main memory to improve performance and utilization. Cache storage is much faster than the main memory, but is also relatively expensive as compared to main memory and is therefore typically employed only in relatively small amounts within a data processing system. In addition, limiting the size of cache storage enhances the speed of the cache. Various levels of cache memory are often employed, with trade-offs between size and access latency being made at levels logically further from the processor(s). Cache memory generally operates faster than main memory, typically by a factor of five to ten times, and may, under certain circumstances, approach the processor operational speed. If program instructions and/or data which are required during execution are pre-loaded in high speed cache memory, average overall memory access time for the system will approach the access time of the cache.

In order to enhance performance, contemporary data processing systems often utilize multiple processors which concurrently execute portions of a given task. To further enhance performance, such multiple processor or multi-processor (MP) data processing systems often utilize a multi-level cache/memory hierarchy to reduce the access time required to retrieve data from memory. A multi-processor system may include a number of processors each with an associated on-chip, level-one (L1) cache, a number of level-two (L2) caches, and a number of system memory modules.

Typically, the cache/memory hierarchy is arranged such that each L2 cache is accessed by a subset of the L1 caches within the system via a local bus. In turn, each L2 cache and system memory module is coupled to a system bus (or interconnect switch) such that an L2 cache within the multi-processor system may access data from any of the system memory modules coupled to the bus.

The use of cache memory imposes one more level of memory management overhead on the data processing system. Logic must be implemented to control allocation, deallocation, and coherency management of cache content. When space is required, instructions or data previously residing in the cache must be "swapped" out, usually on a "least-recently-used" (LRU) basis. Accordingly, if there is no room in the cache for additional instructions or data, then the information which has not been accessed for the longest period of time will be swapped out of the cache and replaced with the new information. In this manner, the most recently used information, which has the greatest likelihood of being again required, is available in the cache at any given time.

As noted, previous cache management techniques mostly depend on least-recently-used (LRU) algorithms in selecting a cache line victim for eviction and replacement. However, empirical measurements have shown that strict least-recently-used algorithms are unsatisfactory in many cases. Various enhancements to LRU algorithms have been proposed or implemented in recent years, such as software managed LRU, pseudo-random influences, etc. Basic symmetric multi-processor snooping protocols have also been utilized to influence cache management.

Even with a cache memory management scheme, there are additional, related problems that can cause system performance to suffer. For example, in data processing systems with several levels of cache/memory storage, a great deal of shuttling of instructions and data between the various cache/memory levels occurs, which consumes system resources such as processor cycles and bus bandwidth which might otherwise be put to more productive processing use. The problem has been exacerbated in recent years by the growing disparity between processor speeds and the operational speeds of the different system components used to transfer information and instructions to the processor.

Additionally, only limited amounts of access history information is shared between horizontal processors/caches within conventional multi-processor systems. Prior art system bus communication of access history is generally limited to coherency information (e.g., indicating in a snoop response that the snooping cache has the line in a shared or modified coherency state).

It would be desirable, therefore, to provide a system increasing the "intelligence" of cache management, and in particular to passing dynamic application sequence behavior information between processors and caches and utilizing that information to optimize cache management.

SUMMARY OF THE INVENTION

It is therefore one object of the present invention to provide an improved data processing system.

It is another object of the present invention to provide improved memory management in a data processing system.

It is yet another object of the present invention to provide improved cache memory management in a multi-processor data processing system, which includes an improved address bus protocol.

The foregoing objects are achieved as is now described.

System bus masters within a multi-processor system in which dynamic application sequence behavior information is maintained within cache directories append the historical access information for the target cache line to their requests. Snoopers and/or the system controller, which may also maintain dynamic application sequence behavior information in a history directory, employ the appended access information for cache management.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIGS. 3A–3C depict comparative diagrams of cache and history directory entries in accordance with the prior art and in accordance with a preferred embodiment of the present invention;

DETAILED DESCRIPTION OF THE PREFERRED EMBODIMENT

Figure 1:
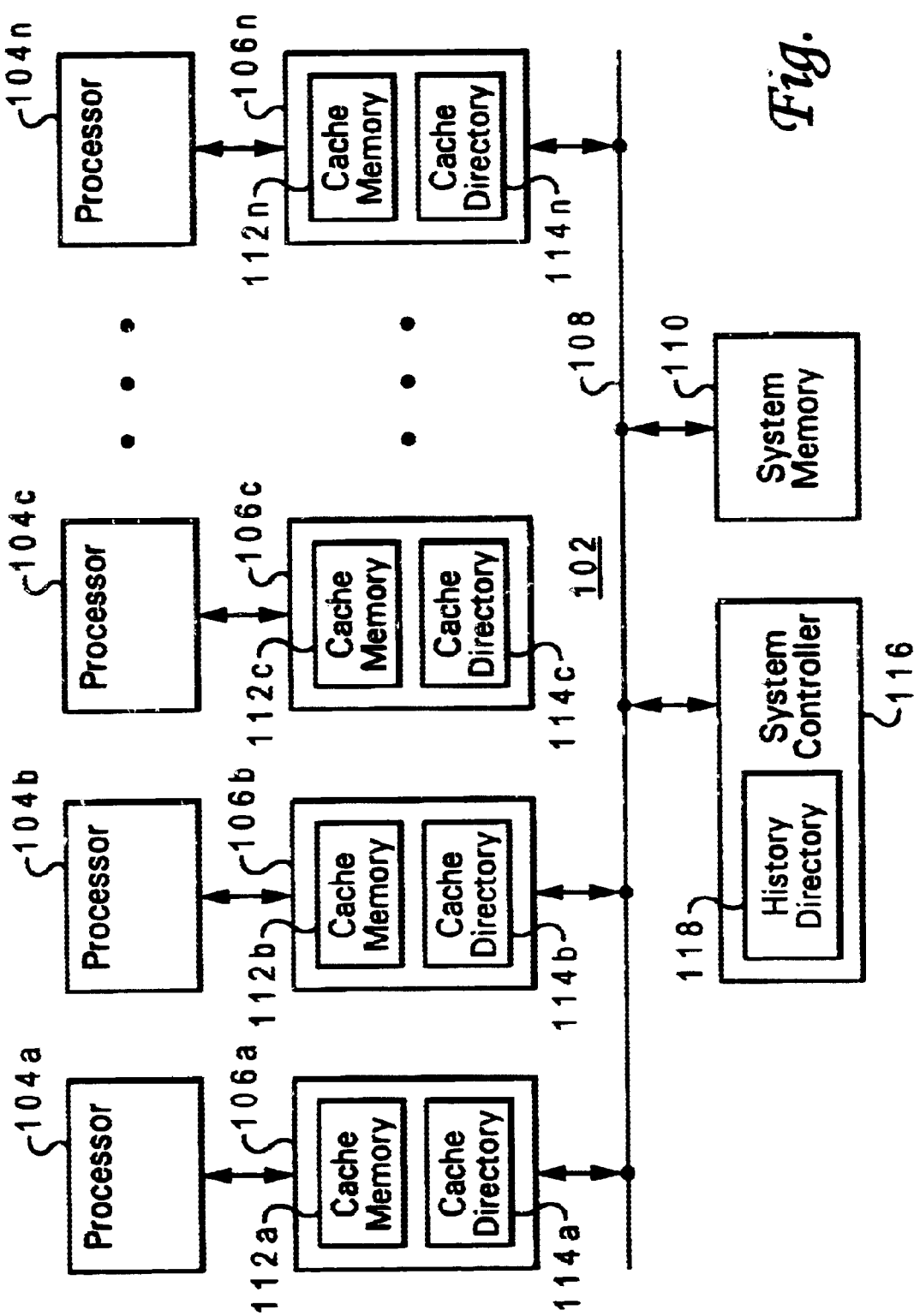
FIG. 1 depicts a multi-processor data processing system in accordance with a preferred embodiment of the present invention.

With reference now to the figures and in particular with reference to FIG. 1, a high level block diagram of a multi-processor data processing system in accordance with a preferred embodiment of the present invention is depicted. Data processing system 102 includes a plurality of processors 104a–104n (where n is any positive integer).

Data processing system 102 also includes a number of caches 106a–106n between the processors 104a–104n and a system bus 108, which couples processors 104a–104n and caches 106a–106n to system memory 110 under the control of system controller 116.

Caches 106a–106n each include a cache memory and cache directory, and may be shared or private, logically in-line or look-aside, and inclusive or noninclusive caches within the present invention. Processors 104a–104n are each coupled to system memory 110 via system bus 108. In a tightly coupled symmetric multi-processor system such as data processing system 102 in the exemplary embodiment, each processor 104a–104n may be utilized to read from and write to memory 110. Thus, systems and interlocks must be utilized to ensure that the data and instructions within memory 110 remain coherent.

Each processor 104a–104n within multi-processor data processing system 102 includes a cache 106a–106n which may be utilized to efficiently and temporarily access and store selected instructions or data from system memory 110. Since each cache memory 112a–112n constitutes a memory space, coherency should be maintained among each cache memory 112a–112n and system memory 110 in order to assure accurate operation. Each cache 106a–106n is therefore connected to system bus 108 and snoops transactions on system bus 108.

Each cache 106a–106n also has an associated cache directory 114a–114n, which each store a plurality of cache directory entries corresponding to memory locations within cache memory 112a–112n. In the present invention, cache directory entries each contain historical processor access, snoop operation, and system controller hint information as described in further detail below.

Also connected to system bus 108 is system controller 116, which may control arbitration for system bus 108 and monitor transactions on system bus 108. System controller 116 includes an associated history directory 118, which contains data relating to the present and past status of each cache 106a–106n, as described in more detail below.

Figure 2:
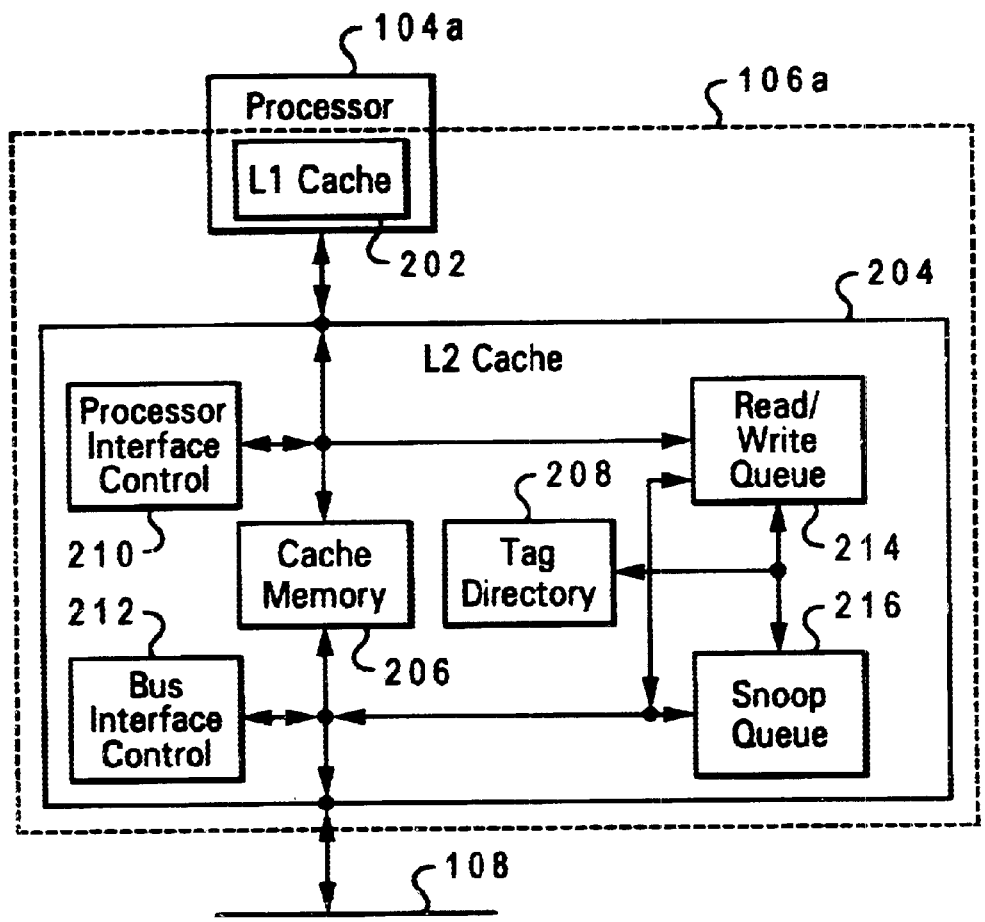
FIG. 2 is a block diagram of a portion of a specific implementation of a data processing system in accordance with a preferred embodiment of the present invention.

Referring to FIG. 2, a block diagram of a portion of a specific implementation of a data processing system in accordance with a preferred embodiment of the present invention is illustrated. The particular implementation of data processing system 102 illustrated in FIG. 2 includes a multilevel cache 106a including a level one (L1) cache 202 and a level two (L2) cache 204. Although depicted as logically discrete, L1 and L2 caches 202 and 204 may be formed within a single integrated circuit die; however, L1 cache 202 is integrally formed with the functional elements of processor 104a while L2 cache 204 is a logically separate component.

L2 cache 204 includes a cache memory 206 and a cache (address tag) directory 208, as well as processor interface control logic 210 controlling communications transactions between cache 204 and processor 104a and bus interface control logic 212 controlling communications transactions between cache 204 and system bus 108. L2 cache 204 also includes a read/write queue 214 controlling processing of data access transactions received from processor 104a within cache 204 and a snoop queue 216 controlling processing of data access transactions snooped from system bus 108 within cache 204. Processor interface control logic 210, bus interface control logic 212, read/write queue 214, and snoop queue 216 may be collectively viewed as a cache controller for L2 cache 204.

Figure 3A:
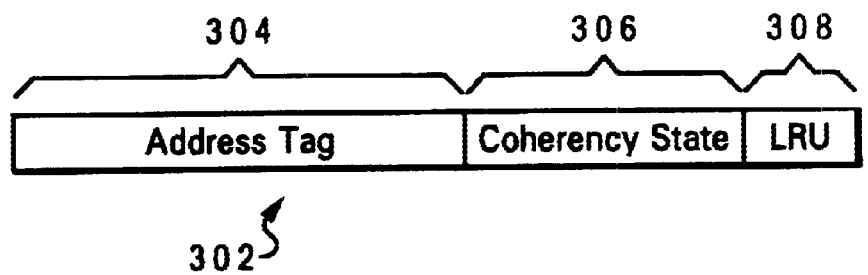

With reference now to FIGS. 3A through 3C, comparative diagrams of cache and history directory entries in accordance with the prior art and in accordance with the present invention are depicted. The data structures depict cache directory entries within L2 cache directory 204 or history directory 118 within system controller 116.

FIG. 3A depicts a prior art cache directory entry format 302 for each cache line within a cache directory 208, which includes: an address tag 304, typically some subset of address bits from the system memory address for the corresponding cache line; coherency state bits 306, which identify a coherency state for the corresponding cache line; and, optionally, LRU bits 308, which identify, within a set-associative cache, the LRU position of the corresponding cache line within the congruence class indexed by the address tag.

Because each processor within a multi-processor system may modify data, such systems must generally employ a protocol to maintain memory coherence. For example, multi-processor systems utilizing processors based upon the PowerPC RISC instruction set architecture (ISA) utilize a coherency protocol having four possible states: modified (M), exclusive (E), shared (S), and invalid (I). The MESI state 306 associated with each cache line (i.e., the line state) informs the data processing system as to what memory operations are required to maintain memory coherence following an access to that cache line.

As noted above, conventional LRU bits 308 within a cache directory entry represent the LRU position within a congruence class for the corresponding cache line. These LRU positions are employed by conventional LRU cache management algorithms to select a victim within a congruence class for deallocation.

FIG. 3B depicts a cache/history directory entry format 310 for each cache line within cache directory 208 in accordance with the present invention. Cache/history directory entry format 310 includes address tag 304, coherency state bits 306, and optional LRU bits 308. In addition, cache directory entry format 310 includes historical processor access, snoop operation, and system controller hint information 312, collected each individual cache controller and passed on to each other.

The historical processor access, snoop operation, and system controller hint information 312 allows the cache controllers to track the operations performed on that cache line by the processors and caches. Historical processor access, snoop operation, and system controller hint information 312 includes an integer number m of subentries each containing information about a processor's access and/or snooping of the corresponding cache line, as well as system controller hints relating to the corresponding cache line. Subentry $T_0$ contains information regarding the most recent processor to access (and thereby gain either shared or exclusive "ownership" of) the corresponding cache line; subentry $T_{-1}$ contains information regarding the next most recent processor to access the corresponding cache line; subentry $T_{-2}$ contains information regarding the processor which accessed the corresponding cache line just prior to the processor of subentry $T_{-1}$; and so on, with subentry $T_{-m}$ containing information regarding the oldest available processor access information for any particular processor which previously accessed the corresponding cache line.

The number m of subentries $T_0, T_{-1}, T_2, \ldots T_{-m}$ within historical processor access and snoop operation information 312 may or may not correspond to the number of processors which share access to the corresponding cache 204. Each subentry $T_0, T_{-1}, T_{-2} \ldots T_{-m}$ includes multiple segments: segments 314a, 314b, and 314c for subentry $T_0$; segments 316a, 316b, and 316c for subentry $T_1$; segments 318a, 318b, and 318c for subentry $T_{-2}$; and segments 320a, 320b, and 320c for subentry $T_{-m}$. The first segments 314a, 316a, 318a and 320a contain historical processor access information regarding the corresponding cache line; the second segments 314b, 316b, 318b and 320b contain historical snoop operation information regarding the corresponding cache line; and the third segments 314c, 316c, 318c and 320c contain historical system controller hint information regarding the corresponding cache line.

The historical processor access information segments 314a, 316a, 318a and 320a of each subentry $T_0, T_{-1}, T_{-2}, \ldots T_{-m}$ contains an identification of the processor which accessed the cache line, an identification of each load or store type operation which was performed on the cache line by that processor, and a timestamp for each operation of when that operation was performed. The historical snoop operation information segments 314b, 316b, 318b and 320b of each subentry $T_0, T_{-1}, T_{-2}, \ldots T_{-m}$ contains an identification of each operation relating to the corresponding cache line which was snooped off the system bus by the respective processor, an identification the processor which originated the snooped operation, and a timestamp for each snooped operation of when that operation was snooped. The historical system controller hint information segments 314c, 316c, 318c and 320c of each subentry $T_0, T_1, T_2, \ldots T_{-m}$ contain an identification of each system controller hint received, and a timestamp for each received hint.

Thus, each subentry $T_0, T_{-1}, T_{-2}, \ldots T_{-m}$ may contain information regarding more than one access by the corresponding processor, as well as more than one snoop operation or system controller hint. Each subentry $T_0, T_{-1}, T_{-2}, \ldots T_{-m}$ may contain either a fixed or a variable number of storage locations for recording access (operation) types or snooped operation types and timestamps, with only information regarding the most recent accesses or snooped operations being maintained if a fixed or otherwise limited number of storage locations are provided.

With each new direct access of the corresponding cache line by a different processor, the content of all subentries are shifted by one position (e.g., the content of subentry $T_0$ is shifted into subentry $T_{-1}$, the content of subentry $T_{-1}$ is shifted into subentry $T_{-2}$, etc.) for the cache directory of the cache receiving the cache line. Information regarding the new processor access of the corresponding cache line is then stored within segment 314a of subentry $T_0$. If a processor reacquires a line which it had previously owned and then given up, the prior access is shifted just as if performed by a different processor and a new subentry $T_0$ is created for the current access by that processor.

Within the cache directory 208, information regarding system bus operations snooped by the same processor is stored within segment 314b of subentry $T_0$. Within the history directory 118, system bus operations snooped by the system controller 116 are stored within segment 314b of subentry $T_0$ in the cache directories, and in segment 324 (see FIG. 3C) in the system controller's history directory 118. If ownership of the corresponding cache line is shared among multiple processors/caches, snooped system bus operations and/or detected system controller hints may be written to corresponding $T_0$ subentries within the entry for that cache line in each cache controller which shares the cache line.

Within cache directory 208, processor access, snooped operation, and system controller hint information received from other processors or caches (e.g., via an intervention) are loaded into subentries $T_{-1}$ through $T_{-m}$ when the cache line/directory entry is first allocated within the processor/cache corresponding to subentry $T_0$.

FIG. 3C illustrates the format of directory entries within history table 118 in accordance with the present invention.

The system controller (system bus controller) typically performs functions such as combining snoop responses, address bus arbitration, data bus arbitration, etc. In the present invention, the system controller 116 implements a history directory 118 in which historical bus sequences are logged on a per cache line basis. The history directory 118 may be either direct mapped or set associative.

The system controller's directory entry format 322 differs from the cache directory entry format 310. History directory entry format 322 includes the address tag 304 and a single log field 324. Just as each cache directory entry within cache directory 208 contains processor accesses and snooped operations detected by the cache controller, each directory entry within history directory 118 contains system a log of all system transactions—or at least those considered important by the system controller—detected by the system controller 116.

System controller 116 maintains within each entry in history directory 118 a log of all system bus transactions relating to the corresponding cache line, or at least those system bus transactions which are deemed important. Each recorded transaction includes:

a. the operation type (read, read with intent to modify, dclaim, etc);

b. the processor identifier for the processor which issued the transaction;

c. the individual responses to this transaction by snoopers;

d. the "hint" or guidance provided by the system controller within the combined response, if any; and f. "hint" generation algorithm updates (e.g., previous guesses determined to be wrong), if any.

Entries 322 within history directory 118 contain different information than entries 310 within cache directory 208. There exists some overlapping information, such as operation type, processor identifier; time stamps, and the hint provide. The system controller 116, however, has visibility to the individual snoop responses from each snooper, while snoopers do not see each other's responses, only the combined response. This additional information aids the system controller 116 in formulating the hints which it provides.

Additionally, history directory 118 may maintain its history of a given cache line when all of the caches have since evicted the line (assuming that the system controller's history directory 118 is able to hold many more entries than just the individual cache directories, taken alone or in combination). When the line is eventually requested by one of the caches, the system controller 116 provides its hint history to the requester, which may then be employed as a starting point to guide cache management as described in further detail below.

When a transaction occurs on the system bus, such as a read, read with intent to modify (rwitm), dclaim, etc., the system controller 116 snoops the operation (together with other bus participants) and looks up the cache line within its "transaction sequence log" or history directory 118. Based on the information within the transaction log for a particular cache line, the system controller 116 may elect to append some hint (guidance) information to the combined snoop response for the transaction.

One example of such system controller hint information relates to read operations. During a read operation, snoopers which have the subject cache line in a shared state may, through hints appended to the combined response by the system controller 116, be induced to go ahead and invalidate their copies when it is likely that a dclaim will soon follow. By invalidating early, it is less likely that a snooper will have to retry the dclaim (due to busy snoop queues) when the dclaim does occur.

Similarly, the master which initiates a read operation may be induced by hints from the system controller 116 to forward the data to the requesting processor without caching the data internally if it is likely that another cache will seek to modify the line soon. By not caching the line to begin with, snoopers will not have to do anything when the operation requiring invalidation of the line occurs, and will not tie up a snoop queue for the invalidating operation. The general goal, in both instances, is to reduce system bus traffic and reduce the average number of times which bus transactions get retried.

If a cache has the target cache line in a modified coherency state and needs to evict the cache line, the cache will pass that cache line's dynamic application sequence behavior (historical processor access, snoop operation, and system controller hint) information 312 to the system controller 116 at the same time as the modified data is being written back to memory. The system controller 116 need not directly store this information within the entry in history directory 118 for the corresponding cache line. Instead, the system controller 116 evaluates this information (in light of the history logged within the corresponding entry of history table 118) to determine whether the hints generation algorithms for this cache line need to be updated.

If a cache controller requests ownership of a cache line and no other caches have a copy of the line, then the data will be sourced from system memory and the system controller 116 will source the hint history log information to the requester. The requesting cache controller then stores this system controller guidance history in the system controller hint history segment of the $T_{-1}$ subentry for the cache line. Unlike processor access and snoop operation history, where different history segments are stored based on the accessing processor, received system controller hint history is stored only in the $T_{-1}$ segment. In this case, since no other cache supplied any history information to the requester, the system controller's hint log is the only history field information with which the requesting cache controller starts out.

By tracking the snooped operations and system controller hints for each cache line, as well as "ownership" changes of each cache line, the cache management algorithms employed by the cache controller may be dynamically influenced. Although potentially less effective for larger caches, such dynamic cache management algorithms should help smaller cache approach the effectiveness of a larger cache through more intelligent cache management. Historical access, snoop operation, and system controller hint information may be utilized to influence victim selection, coherency state transitions, LRU state transitions, deallocation timing, and other cache management functions. The historical processor access, snoop operation, and system controller hint information enables the cache controller to engage in dynamic application sequence behavior, cache management which varies on a per cache line, per processor basis.

The cache controllers and the system controller need not have a set algorithm with respect to the particular actions for employing dynamic application sequence behavior information 312/324 in the different situations described above. Instead, the cache management algorithms may be dynamic and may start with a trial (guess) based on the historical processor access, snoop operation, and system controller hint information and then determine, over time, whether the guess was correct. If the initial guess was incorrect, the cache controllers and the system controller may alter the algorithm the next time a similar situation arises. Over time, as these correct and incorrect decisions are made to change various behaviors, the frequency of incorrect decisions will decrease and the overall cache behavior will converge to a fixed algorithm. This algorithm will eventually be upset when the current software application (process) stops and another is started, and/or when a change occurs in the virtual to real memory address translation.

Figure 4:
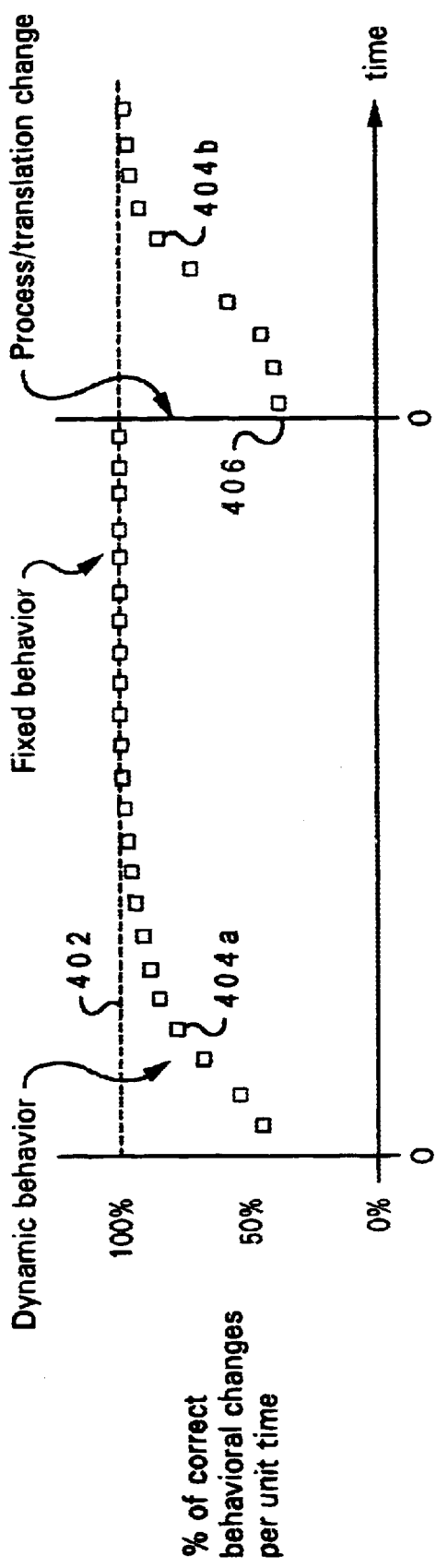
FIG. 4 is a diagram of convergence in dynamic cache management to fixed algorithm cache management utilizing historical processor access, snoop operation, and system controller hint information in accordance with a preferred embodiment of the present invention.

Referring to FIG. 4, a diagram of convergence in dynamic cache management to fixed algorithm cache management utilizing historical processor access, snoop operation, and system controller hint information in accordance with a preferred embodiment of the present invention is illustrated. A fixed algorithm 402 will result in constant behavior, while dynamic cache management based on historical processor access, snoop operation, and system controller hint information as described above will result in changing behavior 404a–404b which gradually approaches a constant. Some events, such as a change in the current software application being run or a change in the virtual to real memory address translation, will cause the behavior, which had previously achieved a steady state, to again change with a gradual approach to a constant. Not shown, however, are the efficiency and/or performance measures achieved for the fixed algorithm region 402, which should exceed those of corresponding dynamic regions 404a and 404b. Note that the fixed algorithm which is converged upon may be unique to a particular cache line. Management of different cache lines it may thus converge to different fixed algorithms.

Figure 5:
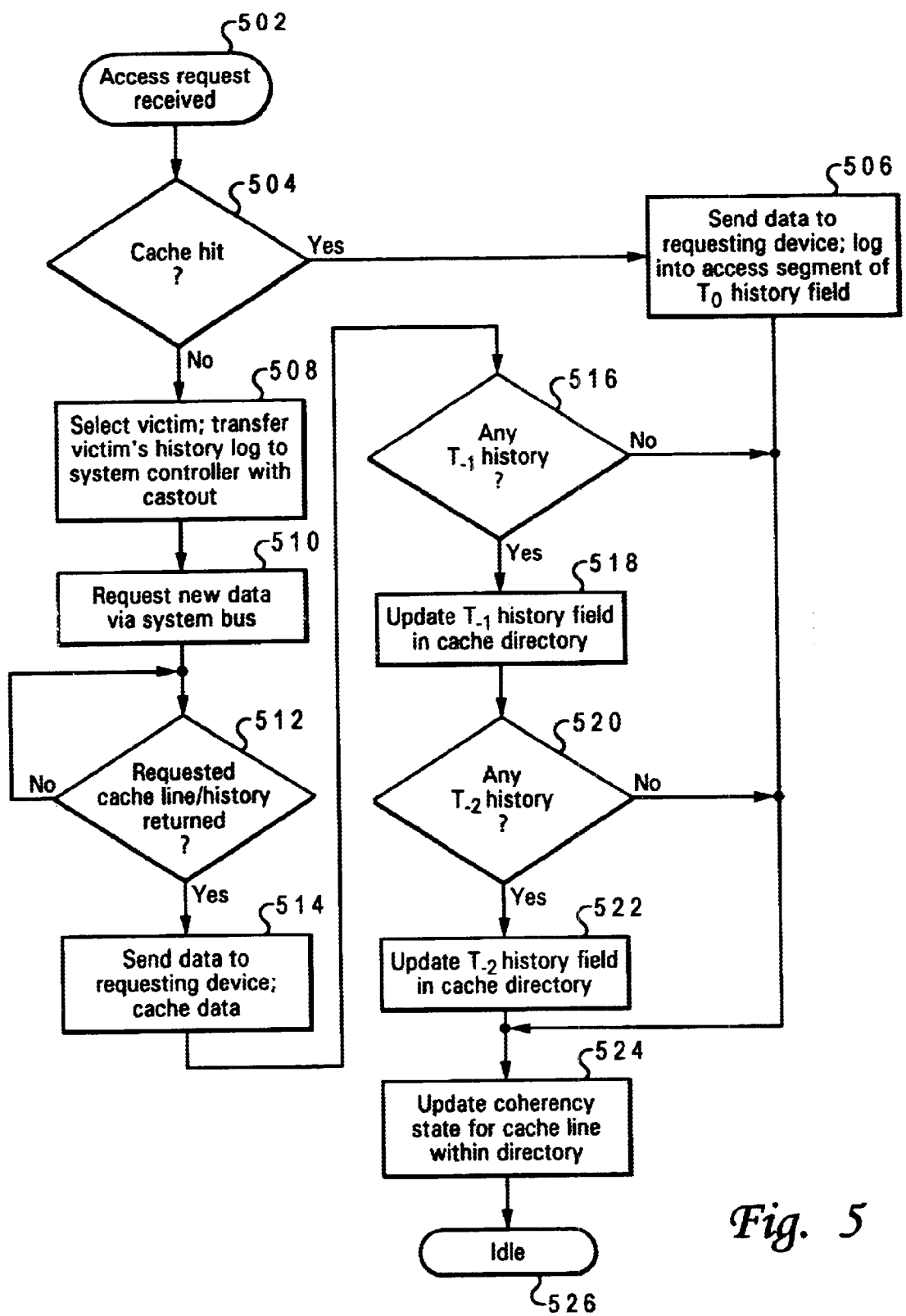
FIG. 5 depicts a high level flow chart for a process of generating processor access history and passing processor access, snoop operation, and system controller hint history for cache lines in accordance with a preferred embodiment of the present invention.

With reference now to FIG. 5, a high level flow chart for a process of generating processor access history and passing processor access, snoop operation, and system controller hint history for cache lines in accordance with a preferred embodiment of the present invention is depicted. The process, which is initially idle, begins at step 502, which depicts a processor access request being received at a cache such as cache 204 depicted in FIG. 2. The process first passes to step 504, which illustrates a determination of whether a cache hit for the requested cache line occurs within the cache receiving the processor access request.

If a cache hit occurs within the cache receiving the access request, the process proceeds to step 506, which depicts sending the requested cache line to the processor (or other device) which requested access and logging the access into the processor access segment of the $T_0$ history field in the cache directory entry for the corresponding cache line. From step 506, the process then passes to step 524, described below.

If a cache miss occurs at step 504, the process proceeds instead to step 508, which illustrates selecting a victim (within the congruence class to which the requested cache line is indexed), which may be based, in part, on the history information, if any, of cache lines within the subject congruence class. The selected victim's history log is transferred to the system controller in conjunction with the write operation (cast-out) for the victim cache line to system memory, and may be employed by the system controller to update hint generation algorithms for this cache line. The process then passes to step 510, which depicts requesting the new cache line via the system bus.

The process then passes to step 512, which illustrates a determination of whether the requested cache line has been returned on the system bus. The requested cache line may be sourced from either system memory or, in the case of an intervention, from another cache within the system. If the requested cache line has not been received, the process returns to step 512 to continue awaiting return of the requested cache line. If so, however, the process proceeds instead to step 514, which depicts sending the cache line to the requesting device and caching the cache line within the cache. The process then passes to step 516, which illustrates a determination of whether any $T_{-1}$ (processor access, snoop operation and system controller hint) history was received for the requested cache line via the combined response extensions. If so, the process proceeds to step 518, which depicts updating the $T_{-1}$ history field for the requested cache line within the cache directory.

The process passes next to step 520, which illustrates a determination of whether any $T_{-2}$ history was received for the requested cache line via the combined response extensions. No $T_{-2}$ history will exist without some $T_{-1}$ history. If $T_{-2}$ history was received for the requested cache line, the process proceeds to step 522, which depicts updating the $T_{-2}$ history field for the requested cache line within the cache directory. The process then passes to step 524, which illustrates updating the coherency state for the cache line within the directory (which may be updated based at least in part on $T_{-1}$ history or $T_{-2}$ history information, if any). The process then passes to step 526, which depicts the process again becoming idle until another access request is received.

Figure 6:
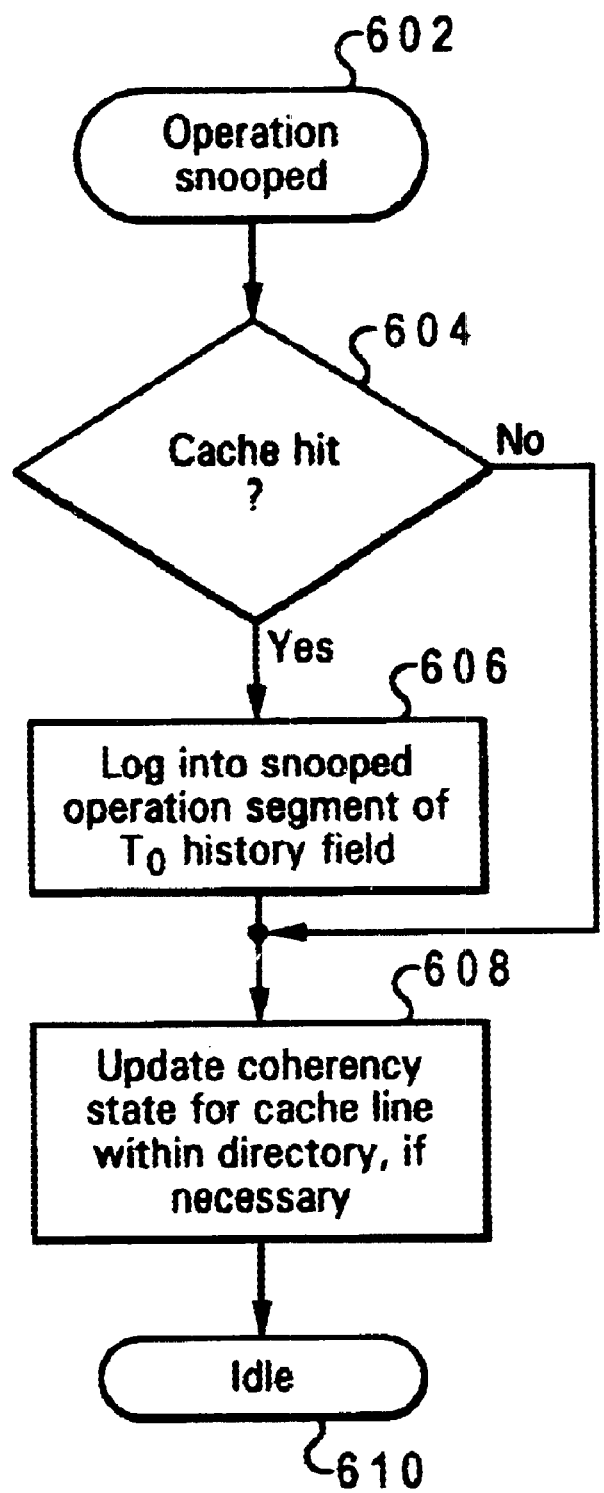
FIG. 6 is a high level flow chart for a process of generating snoop operation history for cache lines in accordance with a preferred embodiment of the present invention.

Referring to FIG. 6, a high level flow chart for a process of generating snoop operation history for cache lines in accordance with a preferred embodiment of the present invention is illustrated. The process, which is initially idle, is actively initiated at step 602, which illustrates an operation being snooped off the system bus by a cache. The process passes first to step 604, which illustrates a determination of whether the snooped operation is a cache directory hit within the snooping cache. If so, the process proceeds to step 606, which depicts logging the snooped operation into the snoop operation segment of the $T_0$ history field of the corresponding cache directory entry. If the snooped operation is a cache miss, or once the snooped operation is logged, the process proceeds to step 608, which illustrates updating the coherency state for the respective cache line within the cache directory, if necessary. The process then passes to step 610, which depicts the process again becoming idle until another operation is snooped off the system bus by the cache.

Figure 7:
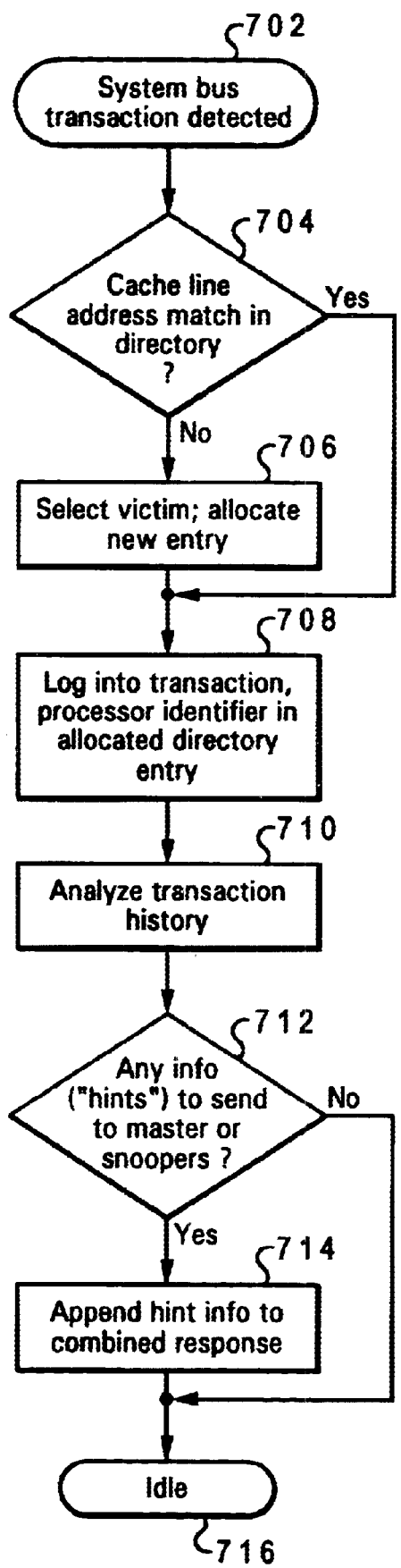
FIG. 7 depicts a high level flow chart for a process of generating and transmitting system controller hints in accordance with a preferred embodiment of the present invention.

With reference now to FIG. 7, a high level flow chart for a process of generating and transmitting system controller hints in accordance with a preferred embodiment of the present invention is depicted. The process, which is executed within the system controller and is initially idle, begins at step 702, which depicts a system bus transaction being detected. The process first passes to step 704, which illustrates a determination of whether the cache line which is the subject of the system bus transaction is a match for an entry within the history directory. If not the process proceeds to step 706, which depicts selecting a victim within history directory for replacement. The manner of selecting a victim is not important, and may be performed utilizing a simple least-recently-used algorithm. A new entry is allocated in place of the selected victim.

Once a new entry has been allocated, or if the cache line address matched an entry within the history directory, the process proceeds to step 708, which illustrates logging the detected transaction, the corresponding processor identifier, and other information into the allocated or matching history directory entry. The process then passes to step 710, which depicts analysis of the transaction history for the subject cache line by the system controller. The process next passes to step 712, which illustrates a determination of whether any information (e.g., "hints") can be derived from the transaction history to send to the bus master initiating the detected system controller hint and/or to snoopers of the detected system controller hint.

If the analysis of the cache line transaction history produces information which might be useful to the bus master and/or any snoopers, the process proceeds to step 714, which depicts appending the "hint" information to the combined response which is returned as a result of the system bus transaction. Otherwise, or once the hint information is appended, the process proceeds to step 716, which illustrates the process becoming idle until another system controller hint is detected.

Figure 8:
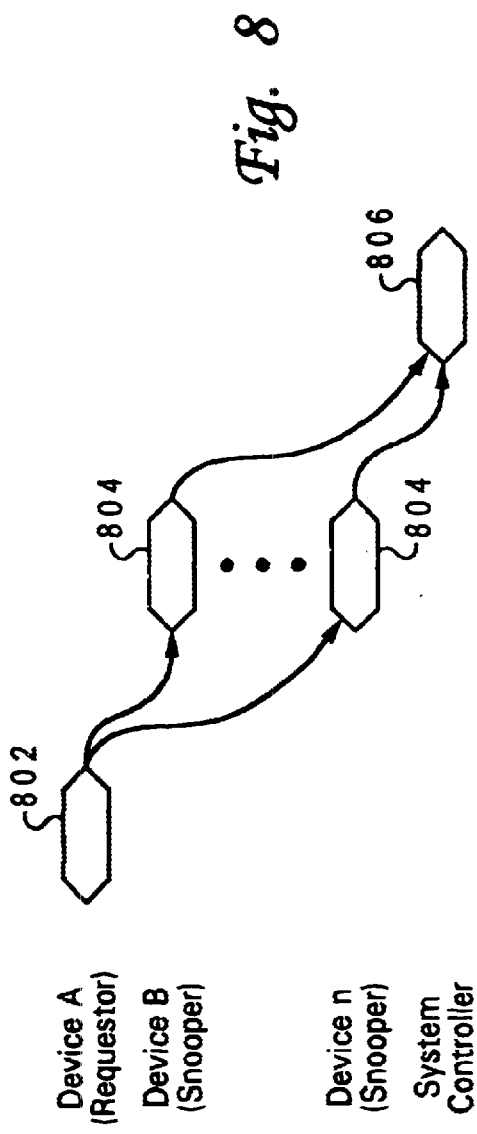
FIG. 8 is a timing diagram illustrating passing of dynamic application sequence behavior among bus participants in accordance with a preferred embodiment of the present invention.

Referring to FIG. 8, a timing diagram illustrating passing of dynamic application sequence behavior among bus participants in accordance with a preferred embodiment of the present invention is illustrated. In the present invention, when a processor or cache ("Device A") initiates an address-only system bus operation 802 such as a dclaim, read or read with intent to modify (rwitm), historical processor access information (which, for read and rwitm operations, may still be within the directory following the previous invalidation of the cache line) within the requester is appended to the operation request 802 for the benefit of snoopers and the system controller.

The historical processor access information which is included within the operation request 802 may be interpreted and employed by the snoopers in making cache management decisions. For example, where a read request includes processor access information from the requester indicating that the requestor is likely to soon claim exclusive ownership of the cache line, a snooping cache may elect to invalidate its copy of the cache line even though the operation does not require such invalidation, eliminating the possibility that the snooping cache will have to retry a subsequent request by the bus master claiming ownership of the line.

As another example, the information passed to snoopers with a dclaim might indicate that, in addition to claiming exclusive ownership of the subject cache line, the bus master is likely to come back and also claim exclusive ownership of the next sequential cache line as well. Snoopers may therefore elect to invalidate the next sequential cache line as well as the subject cache line in order to reduce the number of potential retry responses from snoopers.

With any request 802 issued by a bus master, historical access information appended to the request and maintained within the local directory may induce a snooper to conclude that the cache line is unlikely to be required for a considerable time. Therefore, the snooper may mark that cache line as "least recently used" so that the cache line will be aged out of the snooper's cache sooner than other cache lines within the same congruence class.

Other (horizontal) processors or caches ("Device B" through "Device n") transmit a snoop response 804 to the system controller, which may also include any historical access information associated with the target cache line within the corresponding processor or cache along with the usual coherency response information. In addition to the history information from the master (requester), individual snoop responses 804 are received by the system controller together with any historical access or system transaction information within the history directory for the target cache line, and are employed to generate a combined response 806 which is returned to the requestor and all snoopers.

The present invention provides a system and method for communicating dynamic application sequence behavior information among bus participants within a multi-processor system. The dynamic application sequence behavior information may then be employed to more effectively manage cache contents through intelligent victim selection, caching decisions, and coherency settings.

While the invention has been particularly shown and described with reference to a preferred embodiment, it will be understood by those skilled in the art that various changes in form and detail may be made therein without departing from the spirit and scope of the invention.

What is claimed is:

1. A method of communication in a data processing system including a requesting device and at least one snooper, said method comprising:

a requesting device driving a request on an interconnect to which the snooper is coupled, the request including an address tag of a memory location targeted by the request and historical information individually enumerating each of a plurality of previous operations targeting the memory location associated with the address tag;

where the step of driving said request further comprises:
driving a plurality of subentries in the request, each subentry containing historical information aggregated by a different device,
wherein a first subentry contains historical information aggregated by the requesting device and a second subentry contains historical information aggregated by another device.

2. The method of claim 1, wherein driving said request comprises driving a request including historical information individually enumerating at least one previous operation originated by said requesting device.

3. The method of claim 2, wherein driving a request including historical information individually enumerating at least one previous operation originated by said requesting device comprises driving a request including a processor identifier, an operation code, and a timestamp for at least one previous access by said requesting device targeting the address tag.

4. The method of claim 1, wherein driving said request comprises driving a request including historical information individually enumerating at least one previous operation snooped by said requesting device on the interconnect.

5. The method of claim 4, wherein driving a request including historical information individually enumerating at least one previous operation snooped by said requesting device on the interconnect comprises including within the request a processor identifier, an operation code, and a timestamp for at least one operation targeting the address tag that was previously snooped by the requesting device.

6. The method of claim 1, said data processing system including a system controller, wherein driving said request comprises driving a request including system controller hint information associated with the address tag, wherein said system controller hint information was previously provided by said system controller to said requesting device.

7. The method of claim 1, and further comprising:
driving snoop responses from a plurality of snoopers snooping the request; and
providing a combined response based upon said snoop responses.

8. The method of claim 7, wherein the step of driving a combined response comprises driving a combined response containing at least one hint regarding management of the data associated with the address tag for the requesting device.

9. The method of claim 7, wherein the step of driving a combined response from the system controller on the bus further comprises:
driving a combined response containing at least one hint regarding management of the data associated with the address tag for snoopers driving the snoop responses.

10. The method of claim 7, wherein the step of driving a combined response further comprises:

driving a combined response containing at least one hint regarding management of the data associated with the address tag for the requesting device and at least one hint regarding management of the data associated with the address tag for snoopers driving the snoop responses.

11. The method of claim 7, wherein the step of driving a combined response further comprises:
driving a combined response containing at least one hint selected from:
information regarding access history for the data associated with the address tag,
a suggestion that the requesting device not cache data associated with the address tag,
a suggestion that the requesting device cache data associated with the address tag but allow the data associated with the address tag to age out more quickly than dictated by a strict least recently used algorithm, and
a suggestion that at least one of the plurality of snoopers invalidate, data associated with the address tag.

12. The method of claim 1, wherein the step of driving a request further comprises:
including within the request a coherency state identifier for the data associated with the address tag; and
including within the request a least recently used position for the data associated with the address tag.

13. A data processing system, comprising:
at least a requesting device and a plurality of snooping devices coupled to an interconnect;
a system controller coupled to the interconnect and handling snoop response combination;
wherein said requesting device drives a request on said interconnect including an address tag of a memory location targeted by the request and historical information individually enumerating each of a plurality of previous operations targeting the memory location associated with the address tag;
wherein the plurality of snooping device provide individual snoop responses to said request; and
wherein the system controller, responsive to the snoop responses, provides a combined response on the interconnect.

14. The data processing system of claim 13, wherein the combined response contains at least one hint from the system controller for the requesting device regarding management of data associated with the address tag.

15. The data processing system of claim 14, wherein the at least one hint from the system controller for the requesting device is selected from:
information regarding access history for the data associated with the address tag;
a suggestion that the requesting device not cache the data associated with the address tag; and
a suggestion that the requesting device cache data associated with the address tag but allow the data associated with the address tag to age out more quickly than dictated by a strict least recently used algorithm.

16. The data processing system of claim 13, wherein the system controller includes a history directory containing an entry associated with the address tag, wherein said entry includes operations snooped by the system controller and hints provided by the system controller regarding the data associated with the address tag.

17. The data processing system of claim 13, wherein said historical information comprises historical information individually enumerating at least one previous operation originated by said requesting device.

18. The data processing system of claim 17, wherein said historical information individually enumerating at least one previous operation originated by said requesting device comprises a processor identifier, an operation code, and a timestamp for at least one previous access by said requesting device targeting the address tag.

19. The data processing system of claim 13, said historical information comprises historical information individually enumerating at least one previous operation snooped by said requesting device on the interconnect.

20. The data processing system of claim 19, wherein said historical information individually enumerating at least one previous operation snooped by said requesting device on the interconnect comprises a processor identifier, an operation code, and a tiestamp for at least one operation targeting the address tag that was previously snooped on the interconnect by the requesting device.

21. The data processing system of claim 13, wherein said request further includes system controller hint information associated with the address tag, wherein said system controller hint information was previously provided by said system controller to said requesting device.

22. The data processing system of claim 13, wherein the combined response contains at least one hint from the system controller for at least one of the plurality of snoopers regarding management of data associated with the address tag.

23. The data processing system of claim 22, wherein the at least one hint from the system controller includes a non-imperative suggestion that said at least one snooper invalidate data associated with the address tag.

24. The data processing system of claim 13, wherein the request further comprises:
a coherency state identifier for the data associated with the address tag in the request; and
a least recently used position for the data associated with the address tag in the request.

25. The data processing system of claim 13, wherein said request comprises a plurality of subentries, each subentry containing historical information aggregated by a different device, wherein a first subentry contains said historical information aggregated by the requesting device and a second subentry contains historical information aggregated by another device.

26. A requesting device for a data processing system, said requesting device comprising:
a memory array,
a directory associated with said memory array, said directory including a plurality of entries, each entry including:
an address tag; and
historical information individually enumerating each of a plurality of previous a operations targeting said address tag;
an interconnect interface that drives a request on an interconnect, said request including an address tag of a memory location targeted by the request and historical information from said directory individually enumerating each of a plurality of previous operations targeting the memory location associated with the address tag.

27. The data processing system of claim 26, wherein said requesting device comprises a processing unit and wherein said processing unit includes a processor core.

* * * * *

UNITED STATES PATENT AND TRADEMARK OFFICE
CERTIFICATE OF CORRECTION

PATENT NO. : 6,631,450 B1
DATED : October 7, 2003
INVENTOR(S) : Arimilli et al.

It is certified that error appears in the above-identified patent and that said Letters Patent is hereby corrected as shown below:

<u>Column 14,</u>
Line 17, please delete "tiestamp" and replace it with -- timestamp --.

Signed and Sealed this

Twenty-third Day of November, 2004

JON W. DUDAS
*Director of the United States Patent and Trademark Office*